A. P. MYER.
TIME CONTROLLING MECHANISM FOR ELECTRIC THERMOSTATS.
APPLICATION FILED FEB. 2, 1915.

1,175,976.

Patented Mar. 21, 1916.
2 SHEETS—SHEET 1.

INVENTOR
ALBERT P. MYER
ATTORNEYS

A. P. MYER.
TIME CONTROLLING MECHANISM FOR ELECTRIC THERMOSTATS.
APPLICATION FILED FEB. 2, 1915.

Patented Mar. 21, 1916.

INVENTOR
ALBERT P. MYER

UNITED STATES PATENT OFFICE.

ALBERT P. MYER, OF MINNEAPOLIS, MINNESOTA, ASSIGNOR TO MINNEAPOLIS HEAT REGULATOR CO., OF MINNEAPOLIS, MINNESOTA, A CORPORATION.

TIME-CONTROLLING MECHANISM FOR ELECTRIC THERMOSTATS.

1,175,976.  Specification of Letters Patent.  Patented Mar. 21, 1916.

Application filed February 2, 1915.  Serial No. 5,693.

*To all whom it may concern:*

Be it known that I, ALBERT P. MYER, citizen of the United States, resident of Minneapolis, county of Hennepin, State of Minnesota, have invented certain new and useful Improvements in Time-Controlling Mechanisms for Electric Thermostats, of which the following is a specification.

My invention relates to electric thermostats and particularly to mechanisms for changing the dampers of the heater with which the thermostat is connected at predetermined intervals.

The invention consists generally in independent spring actuated means released by the timing device or clock mechanism for shifting the thermostat.

Further the invention consists in mechanism which releases the thermostat without affecting the time of the clock.

Further the invention consists in mechanism for adjusting the pointer and changing the adjustment of the contact points.

Further the invention consists in a mechanism for setting the releasing hands on the clock independently of one another.

Further the invention consists in a mechanism which will permit the movement of the thermostat contact posts forward or backward without disturbing the clock mechanism.

Further the invention consists in various constructions and combinations, all as hereinafter described and particularly pointed out in the claims.

Figure 3:
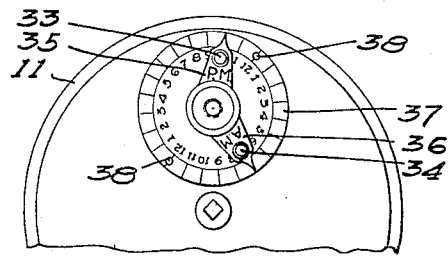
Figure 1:
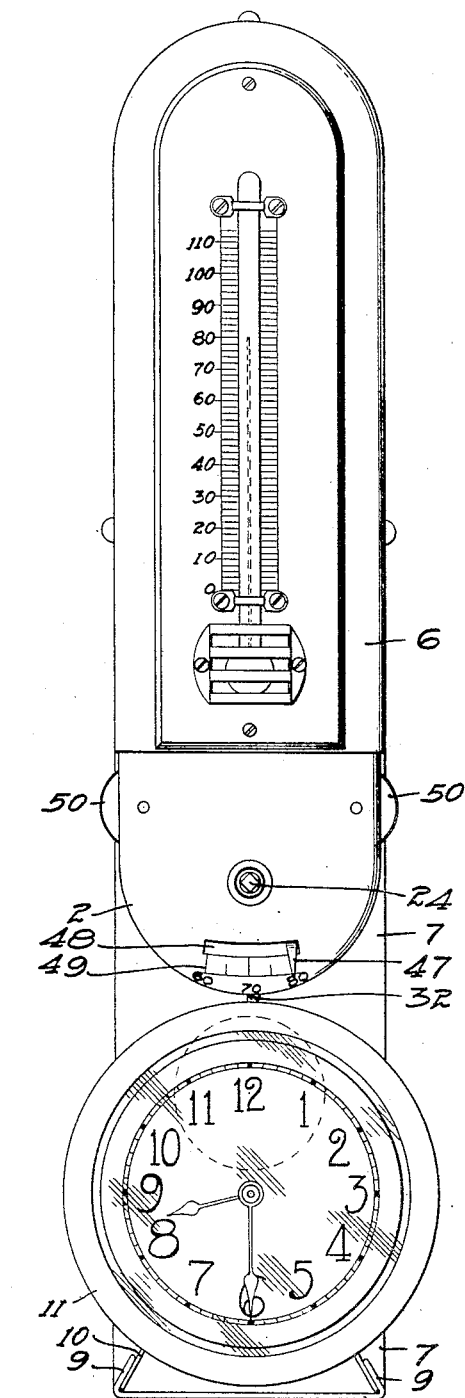
Figure 2:
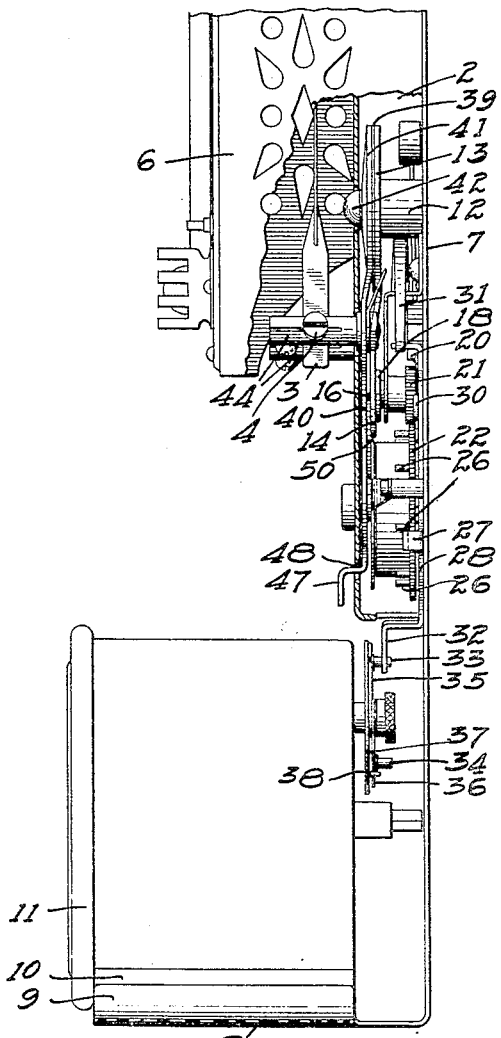
Figure 4:
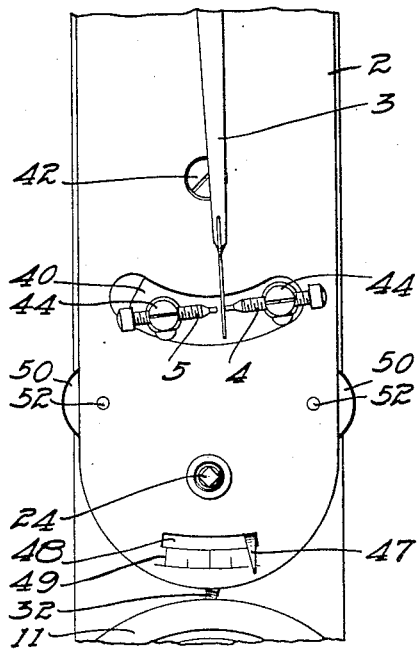
Figure 5:
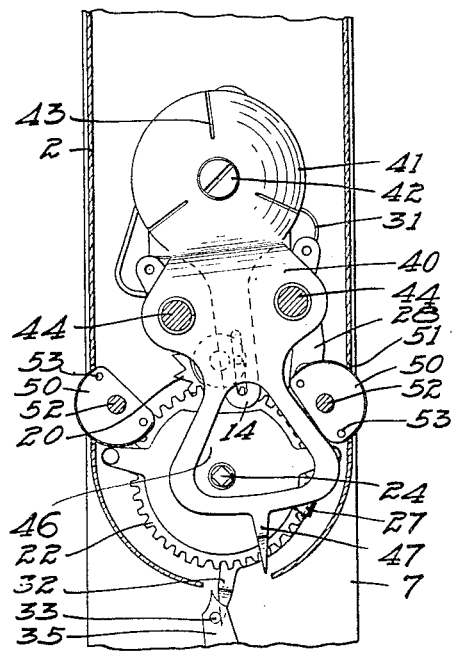
Figure 6:
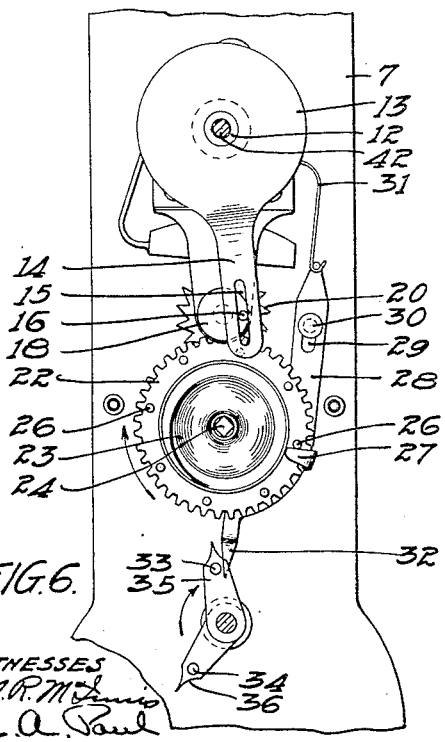
Figure 7:
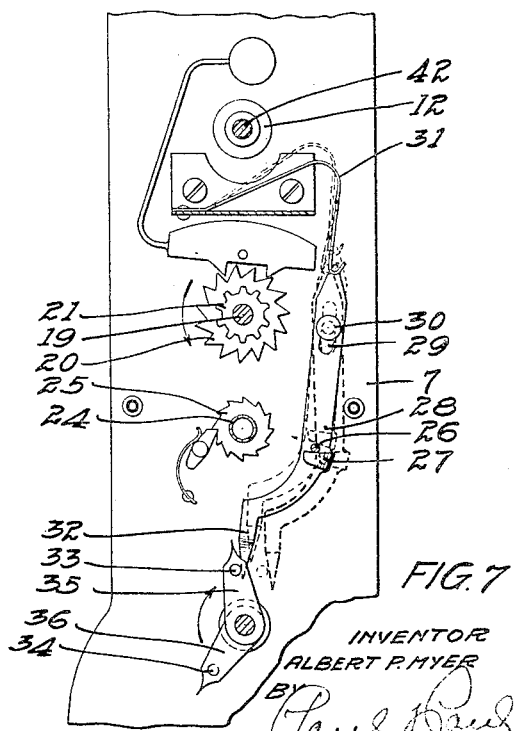

In the accompanying drawings forming part of this specification, Figure 1 is a front view of a thermostat and clock attachment embodying my invention, Fig. 2 is a side view, partially in section, of the same, Fig. 3 is a rear view of the clock, Fig. 4 is a detail view, showing the upper portion of the thermostat with the cover removed, Fig. 5 is a sectional view through the base of the thermostat, Figs. 6 and 7 are detail views of the mechanism within the base of the thermostat for shifting it at a predetermined time.

In the drawing, 2 represents the base of a thermostat having the usual blade with the tongue 3 depending between the contact screws 4 and 5. This base and the tongue are normally concealed by a cover 6.

7 represents a plate, preferably metallic, on which the thermostatic base and the operating mechanism thereof is mounted. This plate preferably depends below the lower end of the thermostat base and has an outwardly turned end portion 8 provided with inwardly turned flanges or wings 9 between which a flanged plate 10 secured to the bottom of a clock 11 is adapted to slide. This clock is preferably held entirely by frictional engagement and may be easily removed or detached for winding purposes or for setting the device for releasing the thermostat shifting mechanism at a predetermined period.

The plate 7 is provided with a stud 12 on which a disk 13 is mounted and provided with a downwardly extending arm 14 having a slot 15 therein to receive a crank pin 16 on a disk 18 that is mounted on the stud 19 of an escapement wheel 20. This escapement wheel has a pinion 21 meshing with the teeth of a gear 22. A spring 23 is secured at one end to this wheel and at the other to a winding post 24, the wheel being normally held against movement in one direction by a ratchet 25. The outer face of the gear wheel is provided with a series of pins 26 mounted at uniform intervals therein in position to engage a finger 27 that is carried by a locking latch 28 and extends outwardly around the edge of the gear wheel into the path of the pins 26. This latch 28 has a longitudinal slot 29 therein to receive a pin 30 on the base 7 on which pin said bar has a limited sliding movement. The upper end of the latch is connected to a spring 31, the tension of which tends to raise the latch while the lower end thereof is provided with a pointer 32 which depends below the gear wheel into the path of pins 33 and 34 mounted on hands 35 and 36 that are connected with the mechanism of the clock, (not shown) and are adapted to move back and forth over the graduations of a dial 37 on the back of the clock. One of these hands is designated for a. m. and the other for p. m., the graduations on the dial indicating the hours of the day and the dial is preferably provided with stop pins 38 which limit the movement of the hands thereon, each hand having a travel of 180 degrees. The pins 33 and 34 are in position to engage the pointer 32 when the clock has reached the hour for which the indicator hand 35 or 36 may be set. At that point the latch 28 will be rocked, as indicated in Fig. 7, disengaging one of the pins 26 from the finger 27, whereupon the spring 31 will lift the latch 28 out of the path of the indicator pin 33 or 34 and the disk 13, with the arm 14, will be rocked and the disk 18 revolved a half revolution. The spring 31 has a tendency to rock the latch 28 and swing its lower end inwardly as well as to lift upwardly on the latch, and consequently, when the latch has been lifted a sufficient distance to clear the indicator pin, the spring 31 will swing the latch inwardly so that the finger 27 will move into the path of the next pin on the gear wheel and be engaged thereby, and the latch will thereupon be forced downwardly to its former position on the other side of the actuating pin. This will all take place during the half revolution of the disk 18 and in the rocking of the disk 13, the movement being controlled by the escapement device above referred to.

Upon the disk 13 I place a frictional washer 39 and on the upper end of a plate 40 I mount a circular disk 41 fitting the surface of the frictional disk and secured thereon by suitable means, such as a clamping screw 42 that is tapped into the post 12. The part 41 has radial slots 43 therein, forming wings or segments which yield under the pressure of the screw and bear on the frictional washer with sufficient pressure to prevent the plate from moving accidentally or swinging it when the disk 13 is operated by the release of the latch 28, and the movement of the crank disk 18. At the same time, this frictional engagement will allow the plate 40 to cease movement at any predetermined point, while the disk continues to the end of its stroke. This obviously is for the purpose of allowing any desired range of automatic adjustment of the thermostat between the extremes of movement of the crank disk. Binding posts 44 are mounted in the plate 40 and provided with contact screws 4 and 5 between which the tongue 3 depends. The adjustment of these contact screws determines the range of the thermostat in changing the dampers. The nearer these contact screws are set to the tongue, the closer will be the adjustment of the thermostat, as usual in devices of this kind. The lower portion of the plate 40 has an opening 46 therein through which the winding post of the spring extends and at the bottom of the plate is a finger 47 which is upwardly and downwardly curved and passes through a slot 48 in the base of the thermostat and is movable over a graduated scale 49, this scale being usually marked to indicate a range from 60 to 80 degrees, the intermediate mark representing 70 degrees.

On each side of the plate 40 I provide cams 50 projecting through slots 51 in the side walls of the base and having milled edges for engagement by the fingers for rotating the cams on their supports 52, the distance of such rotation being regulated by pins 53. These cams serve as stops to limit the oscillating movement of the plate 40 and the range of its adjustment. By rotating these cams, the attendant can prevent the adjustment of the thermostat above or below certain degrees, the travel of the plate depending upon the position of the cams. If it is desired to keep the range of adjustment between 65 and 75 degrees, it is only necessary for the cams to be set to prevent movement of the plate past these points.

It will be noted that this device does not depend upon power of the clock spring for shifting the thermostat. The clock merely operates to release an independent spring through the power of which the thermostatic contact posts are shifted to close a circuit through the thermostat and open or close the dampers of the furnace, as the case may be. Furthermore, it will be noted that whenever desired, the thermostat may be shifted to change its adjustment without affecting the clock mechanism. In other words, the shifting of the thermostat may be accomplished automatically through the clock or manually by movement of the contact post supporting plate and the adjustment of the finger 47 over the graduated scale of the thermostat.

I have found that when the clock device is used only to trip an auxiliary power, such as the spring for operating the shifting mechanism, that the clock will keep much better time than when the power of its own spring is relied upon to change the thermostat, and I therefore regard this feature of my device as an important improvement in mechanisms of this kind.

In the operation of the device, the indicator hands 35 or 36 are set on the hours or at the times at which it is desired for the thermostat to be automatically shifted. For instance, assuming that the user of the device wishes the thermostat to be switched down at, say, 10 o'clock p. m., the indicator hand 35 or 36 will be set for that time and if he desires the thermostat to be switched up and the dampers opened at, say, 7 o'clock in the morning, he will set the other or a. m. indicator hand for that hour. The clock being in running order, the indicator hands will revolve and when the time for changing the thermostat arrives, the pin on one of the indicator hands will engage the depending end of the latch 28 and rock it sufficiently to release the gear wheel and allow the spring connected therewith to revolve the gear, turn the disk 18 a half revolution, and through the frictional engagement of the plate 40 with the washer 39 swing the binding post 44 from the high point at which the finger 47 may be set on the scale to the desired night time temperature, and thereupon the circuit will be closed through the thermostat to close the direct draft and open the check.

It may be that the user desires only a range of a few degrees in the shifting of the thermostat and he will therefore adjust the cams 50 to restrict or limit the swinging movement of the plate 40 within these degrees and when said plate 40 contacts with one of these cams, its movement will be arrested, while the disk 13 will continue to the end of its stroke or the end of the half revolution of the disk 18. When the time arrives for switching the thermostat up, say at 7 o'clock a. m., the other indicator hand, contacting with the depending portion of the bar 28, will trip it and again release the gear wheel, moving the crank disk 18 another half revolution and swinging the plate 40 and the binding posts back to their normal position or the point of adjustment of the thermostat for the daytime temperature. If for any reason it is desired to shift the thermostat during the day without disturbing the clock, it is only necessary to move the contact post supporting plate by grasping the finger 47 and moving it back and forth over the scale.

In various ways the details of construction herein shown and described may be modified and still be within the scope of my invention.

I claim as my invention:

1. The combination, with a thermostat and contact posts therefor, of a spring-actuated mechanism for shifting said posts, a locking latch for normally locking said mechanism, a time device having indicator hands and a dial therefor, said locking latch projecting into the path of said indicator hands to be actuated thereby, and means for moving said locking latch to clear said indicator hand when said locking latch has been moved to its released position.

2. The combination, with a thermostat and contact posts therefor, of a spring actuated mechanism for shifting said posts, a locking latch for normally locking said mechanism, a time device having indicator hands and a dial therefor, said locking latch projecting into the path of said indicator hands to be actuated thereby, and a spring connected with said locking latch for moving it to shift it from a position in front of an indicator hand to a position in the rear thereof, said spring also returning said locking latch to its normal locking position when it has been moved out of the path of the indicator hand.

3. In a thermostat, the combination with a thermostatic bar of contact posts, a supporting plate for said posts, a shifting mechanism having a positive uniform movement and frictional engagement with said plate stops in the path of said plate for limiting the travel thereof while said shifting mechanism continues to the end of its stroke, and means for operating said shifting mechanism.

4. In a thermostat, a spring-actuated gear wheel and an escapement therefor, an oscillating plate connected with said gear wheel, a second plate mounted on said first named plate to be operated thereby, contact posts mounted in said second plate, a thermostatic bar mounted between said posts, means for limiting the stroke of said second plate and means for releasing said gear.

5. In a thermostat, a spring-actuated shifting mechanism, a frictionally held plate and contact posts mounted thereon and actuated by the movement of said shifting mechanism, stops mounted in the path of said plate for regulating the stroke thereof, means for normally locking said shifting mechanism, means for automatically tripping it at predetermined periods, said frictionally held plate having means for shifting it manually, independently of said mechanism.

6. In a thermostat, a spring-actuated gear having pins mounted at uniform intervals in the face thereof, a latch having means projecting into the path of said pins for locking said gear, said latch having an oscillating movement to release said gear and provided with means for yieldingly holding it in the path of said pins, a time device having means for tripping said latch to release said gear, contact posts and a supporting member therefor operatively connected with said gear, said connections permitting the movement of said contact posts to be checked at any point in the travel of said gear.

7. The combination, with a thermostat having contact posts and a shifting mechanism therefor, of a clock supported on the lower portion of said thermostat and slidably mounted on its support for removal therefrom, and indicating means connected with said clock for engaging said shifting mechanism.

8. The combination, with a thermostat, of a shifting mechanism having a positive, uniform movement, a contact post supporting member actuated by and frictionally connected with said shifting mechanism, stops adjustably mounted in the path of said supporting member for regulating the travel thereof independently of said shifting mechanism, and a time device in connection with said shifting mechanism.

9. In a thermostat, movable contact points, means for positively shifting said contact points at predetermined periods, means for automatically locking the contact points to each of their adjusted positions, and means for unlocking said points at the predetermined period of adjustment.

10. In a thermostat, a gear wheel, a pinion meshing therewith, a movable plate and means connecting it with said pinion, a second plate mounted on said first named plate and oscillated by friction through the movement of said first named plate, contact posts carried by said second plate, an actuating spring and an escapement device for said gear wheel, a locking latch therefor, and a time device for tripping said locking latch.

11. In a thermostat, movable contact points shiftable to alternate positions at predetermined periods, a time actuated member provided with parts adjustable to fix the periods for shifting the contacts, and means for positively shifting the contacts and under the control of the adjustable parts of said moving member.

12. The combination, with a thermostat and contact points, of a spring-actuated shifting mechanism for moving said points for both high and low adjustment, a locking device, and a time piece having means for tripping said locking device at predetermined periods to permit the movement of said contact points in both directions for day and night adjustment.

13. The combination, with a thermostat and contact points, of a time piece having a dial and positively operated arms mounted for adjustment thereon, and a shifting mechanism for said points having means for moving it independently of said time piece and positioned to be released at predetermined intervals by the movement of said arms.

14. The combination, with a thermostat and contact points, of a spring-actuated shifting device for said points, a lock device movable in the same direction to trip said shifting mechanism for both adjustments of said points, and a time piece having means adjustable for different periods positioned to successively operate said lock device.

15. The combination, with a thermostat and contact posts therefor, of a spring-actuated shifting mechanism for said posts, a locking device for normally locking said mechanism, a time device having means for tripping said locking device, and means for moving said locking device lengthwise to clear said tripping means when said locking device has been moved to its released position.

16. The combination, with a thermostat and contact points therefor, of a shifting mechanism, spring-actuated in both directions, a locking device therefor, and a time device having means for tripping said locking device to release said mechanism at predetermined intervals and shift said points in both directions for day and night adjustment.

In witness whereof, I have hereunto set my hand this 18th day of January, 1915.

ALBERT P. MYER.

Witnesses:
 EDWARD A. PAUL,
 GENEVIEVE E. SORENSEN.